US011271653B2

(12) United States Patent
Takahashi et al.

(10) Patent No.: US 11,271,653 B2
(45) Date of Patent: Mar. 8, 2022

(54) IN-VEHICLE OPTICAL NETWORK

(71) Applicant: National Institute of Information and Communications Technology, Tokyo (JP)

(72) Inventors: Ryo Takahashi, Tokyo (JP); Tetsuya Kawanishi, Tokyo (JP); Naokatsu Yamamoto, Tokyo (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 0 days.

(21) Appl. No.: 17/267,002

(22) PCT Filed: Jun. 3, 2019

(86) PCT No.: PCT/JP2019/021921
§ 371 (c)(1),
(2) Date: Feb. 8, 2021

(87) PCT Pub. No.: WO2020/031477
PCT Pub. Date: Feb. 13, 2020

(65) Prior Publication Data
US 2021/0167855 A1 Jun. 3, 2021

(30) Foreign Application Priority Data

Aug. 9, 2018 (JP) .............................. JP2018-150918

(51) Int. Cl.
*H04B 10/275* (2013.01)
*H04J 14/02* (2006.01)
(Continued)

(52) U.S. Cl.
CPC ........ *H04B 10/275* (2013.01); *H04J 14/0283* (2013.01); *H04L 12/40013* (2013.01); *H04L 12/462* (2013.01)

(58) Field of Classification Search
None
See application file for complete search history.

(56) References Cited

U.S. PATENT DOCUMENTS

| 5,600,466 A * | 2/1997 | Tsushima | H04J 14/0212 |
| | | | 398/1 |
| 2007/0133998 A1* | 6/2007 | Xia | H04B 10/40 |
| | | | 398/155 |

FOREIGN PATENT DOCUMENTS

| JP | 1995-212347 | 8/1995 |
| JP | 1995-250029 | 9/1995 |
| JP | 2016-19176 A | 2/2016 |

* cited by examiner

*Primary Examiner* — David W Lambert
(74) *Attorney, Agent, or Firm* — Liang Legal Group, PLLC

(57) ABSTRACT

[Problem] To provide a novel optical network which can be used as an in-vehicle optical backbone network and exhibits high capacity, low delay, low power consumption, low noise and low cost. [Solution] An optical network system, wherein: a signal processing unit 13 controls a light source 11, and generates an optical signal which includes an information portion to be read by one of the gateway units 5a, and a continuous light portion to be written thereby; a network control unit 15 generates an electrical signal which designates a gate y unit 5a and pertains to whether the information incorporated into the optical signal is to be read or written; and when designated by the electrical signal, each of the gateway units 5a transfers information to and from an electronic control unit 7, and reads information included in the corresponding optical signal or writes information in the (Continued)

(a) BASIC CONFIGURATION DIAGRAM

(b) OPERATION PRINCIPLE continuous light portion, on the basis of the information included in the electrical signal about whether to read or write information.

6 Claims, 4 Drawing Sheets

(51) Int. Cl.
*H04L 12/40* (2006.01)
*H04L 12/46* (2006.01)

(a) STAR TYPE (b) RING TYPE

FIG. 3

(a) EXAMPLE USING OPTICAL SPLITTER (b) EXAMPLE USING OPTICAL SWITCH

FIG. 4

(a) BASIC CONFIGURATION DIAGRAM (b) OPERATION PRINCIPLE

FIG. 5

(a) ELECTRIC FIELD ABSORPTION TYPE DEVICE (b) FABRY-PEROT INTERFERENCE TYPE DEVICE

FIG. 6

(a) UNBIAS ⇒ TRANSPARENT STATE

(b) REVERSE BIAS ⇒ LIGHT-RECEIVING ELEMENT (c) VOLTAGE MODULATION ⇒ MODULATOR

FIG. 7

(a) PHYSICAL CONFIGURATION DIAGRAM (b) LOGICAL CONFIGURATION DIAGRAM

FIG. 8

(a) RING RESONATOR + ELECTRIC FIELD ABSORPTION TYPE DEVICE (b) BANDPASS FILTER + FABRY-PEROT INTERFERENCE TYPE DEVICE

FIG. 9

(a) IN CASE OF SINGLE WAVELENGTH (b) IN CASE OF MULTIPLE WAVELENGTHS

IN-VEHICLE OPTICAL NETWORK

TECHNICAL FIELD

The present invention relates to an optical network system. More specifically, the present invention relates to an optical network system for short-range information communication in which control information is transmitted via an electrical signal, and information is transmitted via an optical signal.

BACKGROUND ART

Currently, an automobile technology is entering a technological innovation era once every 100 years, and rapid digitization is underway. Until now, in-vehicle NWs (such as CAN, LIN, FlexRay, and MOST) optimized in different schemes have been developed for various functions (such as a safety system, a control system, an information system, and a body system) required for automobiles, and they were functioning independently without being connected.

Figure 1:
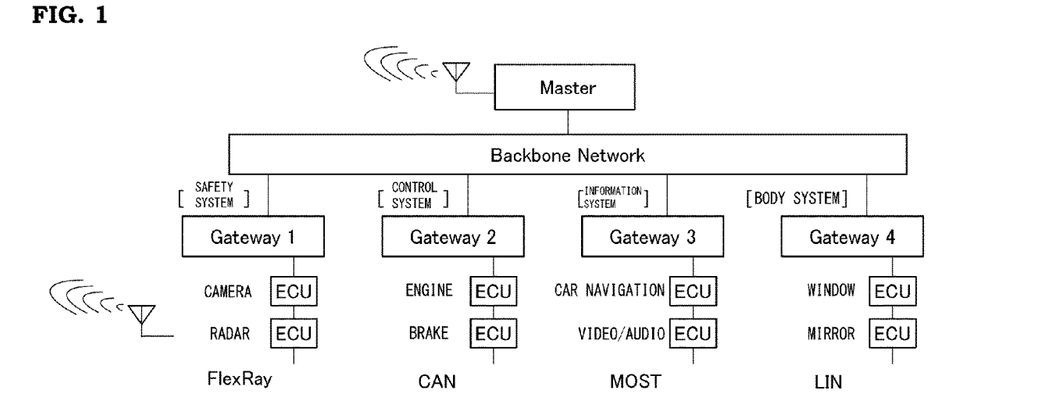
FIG. 1 shows a conceptual diagram illustrating an in-vehicle network.

Studies have been made for the automobile technology for the further future such as a connected technology for connecting all things and cars using a 5G high-speed wireless technology, an autonomous automatic driving technology accompanied with an AI technology and a sensing technology, and an infotainment technology for enjoying various types of information such as a 4 k/8 k video in a car. However, it is considered that, in order to realize such technologies, the number of electronic control units (ECUs) for controlling each part of a vehicle will increase remarkably (from about 100 at present to about 1000 in the future). In addition, a large-capacity backbone network becomes indispensable for controlling the entire vehicle by integrating multiple networks that have existed independently for each function. FIG. 1 is a conceptual diagram illustrating an in-vehicle network.

Currently, for its realization, studies are being actively made for in-vehicle backbone networks based on the Ethernet (registered trademark) technology, which is established in the field of communication and where inexpensive parts are available. However, in an electric wiring network using inexpensive UTP cables, it is difficult to obtain a high speed and a large capacity. In addition, the electric wiring network faces many problems such as an increased delay time, a power consumption, a harness weight, and an electromagnetic interference noise.

Introduction of the optical network technology based on optical fibers is expected as a solution to these various problems, and various studies are underway. By replacing electric cables with optical fibers, it is possible to easily realize a high speed and a large capacity, which is very effective in reduction of the harness weight and the electromagnetic interference noise.

However, such a method applies the conventional optical communication technology to the in-vehicle network as it is. Therefore, it is difficult to solve the power consumption and the delay time and reduce the cost.

In this regard, it is desirable to provide an in-vehicle optical backbone network having a large capacity, a low delay, a low power consumption, a low noise, and a low cost by using a new optical communication method.

Figure 2:
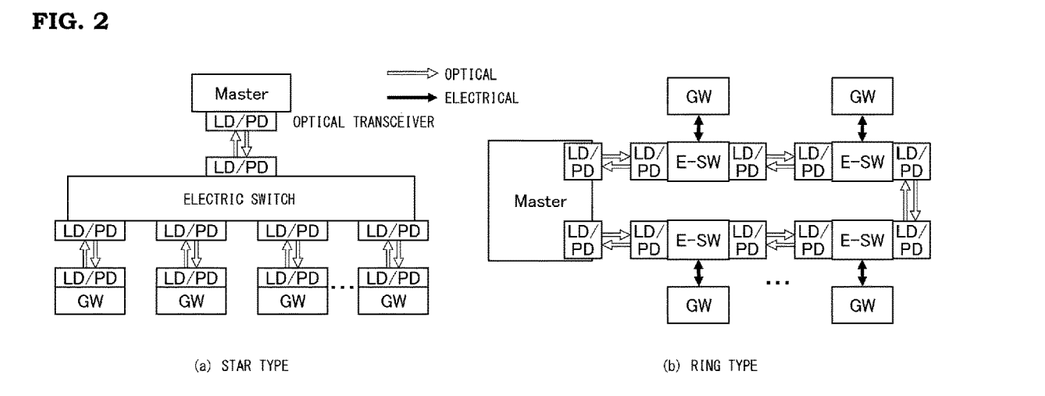

A basic network configuration obtained by replacing electric cables with optical fibers is illustrated in FIG. 2 (Non-Patent Document 1). FIG. 2 is a conceptual diagram illustrating an example of an in-vehicle optical network using an electrical switch. FIG. 2(a) illustrates a star type, and FIG. 2(b) illustrates a ring type. Between a master device and an electrical switch and between a gateway device (hereinafter, referred to as "GW") and an electrical switch, data is transmitted via an optical fiber after being converted from an electrical signal to an optical signal by an optical transceiver. Although this method enables high-speed data transfer by using the optical fiber, a large number of optical transceivers are necessary. Furthermore, it is necessary to continuously transmit a dummy signal even when there is no data to transmit in order to prevent clock signals from stopping in the receiver side. Therefore, power is significantly uselessly consumed. In addition, the electrical switch performs tasks such as address recognition, buffering for collision avoidance, and route switching. However, since inexpensive switches are slow, it is difficult to solve the delay time problem.

Figure 3:
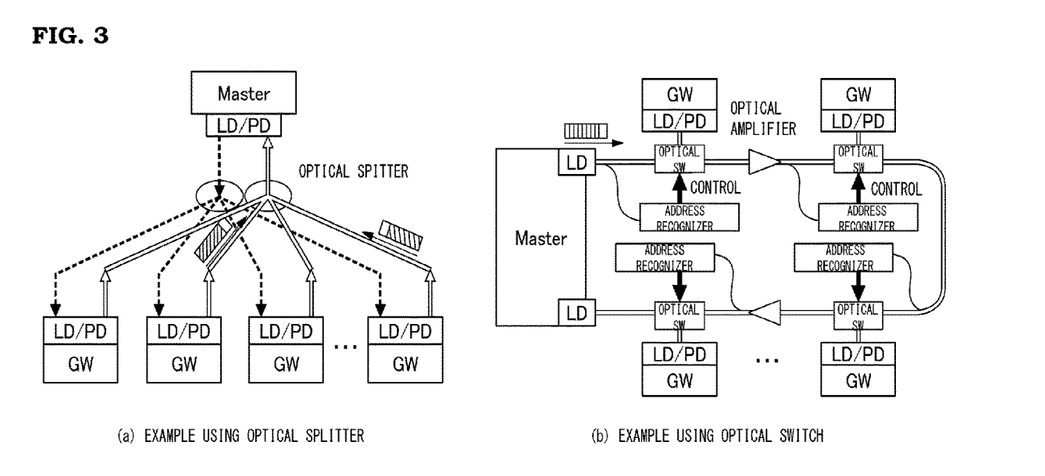

Next, a method using on an optical splitter or an optical switch instead of the electrical switch is illustrated in FIG. 3 (Non-Patent Document 2). FIG. 3 is a conceptual diagram illustrating an example of an all-optical type in-vehicle optical network. FIG. 3(a) illustrates an example using an optical splitter, and FIG. 3(b) illustrates an example using an optical switch. In the methods based on these optical network technologies, the optical signals can be transmitted between the master and the GW as light. Therefore, it is possible to remarkably reduce delay and reduce the number of optical transceivers by half.

The method using the optical splitter in FIG. 3(a) is based on the PON technique of the access network. When data is transmitted from the master to the GW, the optical signal is divided by the optical splitter and distributed to all the GWs. In this case, signals matching the GW address are received, but all the mismatching signals are discarded. Conversely, when data is transmitted from the GW to the master, the data is transmitted in order from the GW such that the optical signals from the GW do not collide with each other. In this case, the optical signal is transmitted in the form of burst-mode optical packet instead of a continuous signal. Therefore, the receiving side of the master is necessary to have an expensive optical burst-mode receiver capable of instantly reproducing clocks.

In the method using the optical switch illustrated in FIG. 3(b), it is necessary to separately prepare an address recognizer embedded in the electrical switch. In addition, since it is also necessary to transmit the data in the form of a burst-mode optical packet, an expensive burst-mode receiver is indispensable in the receiving side, which causes a remarkable cost increase. Furthermore, since it is necessary to segment some optical signals and transmit them to the address recognizer, an optical amplifier for compensating for a large optical loss is required in the case of the ring-type network form as illustrated in the drawing.

In addition, a method using a wavelength routing technique for switching an optical path using an optical wavelength was also proposed (Non-patent Document 3). However, it is necessary to equip a large number of lasers having different wavelengths or a high-speed tunable laser, which causes a significant cost increase.

CITATION LIST

Non-Patent Documents

[Non-patent Document 1] Shigeru Kobayashi et al., "*Evaluation of Modal Power Distribution of Automotive Optical Gigabit Ethernet Connections*" Journal of Light wave Technology, vol. 35, no. 17, p 3664, 2017

[Non-patent Document 2] Daniel Krous et al., "*Replacement of the Controller Area Network (CAN) Protocol for Future Automotive Bus System Solutions by Substitution via Optical Networks*", International Conference on Transparent Optical Networks (ICTON) 2016, Mo.D6. 1

[Non-patent Document 3] Mohammad S. Ab-Rahman et al., "*A Novel Star Topology POF WDM System*", IEEE Symposium on Business, Engineering and Industrial Applications (ISBEIA) 2011, p 259

SUMMARY OF INVENTION

Problems to be Solved by the Invention

An object of the present invention is to provide a new optical network that can be used as an in-vehicle optical backbone network with a large capacity, a low delay, a low power consumption, a low noise, and a low cost by using a new optical communication scheme.

Means for Solving the Problems

The present invention is based on a basic concept that it is possible to provide an optical network having very excellent performance in a larger capacity property, a lower delay property, a lower power consumption property, and the like, compared to in-vehicle network systems (electrical and optical) proposed in the art by configuring an optical network with a single light source by combining an electric C-plane and an optical D-plane. The present invention also includes an extension of this basic concept. This technology is applicable as a new short-range large-capacity optical communication system not only for cars, such as automobiles, but also for various vehicles, such as airplanes, ships, and trains.

The first aspect of the present invention relates to an optical network system 1.

This optical network system 1 includes a (first) master unit 3, a plurality of gateway units 5a, 5b, and 5c connected to a (second) master unit 3, and an electronic control unit 7 connected to each of a (third) plurality of gateway units 5a, 5b, and 5c.

The master unit 3 includes a light source 11, a signal processing unit 13, a network control unit 15, and photodetector 17.

The signal processing unit 13 controls the light source 11 to generate an optical signal including an information portion to be read by any one of the gateway units and a continuous light portion to be written by any one of the gateway units.

The network control unit 15 designates any one of the gateway units and generates an electrical signal regarding whether to read or write the information loaded on the optical signal from the light source.

Each of the gateway units 5a, 5b, and 5c reads information contained in the corresponding optical signal or writes information to the continuous light portion, and exchanges information with the electronic control unit 7 on the basis of information regarding whether to read or write information contained in the electrical signal when designated by the electrical signal.

The photodetector 17 reads the information written to the continuous light portion by any one of the gateways.

One of preferable aspects of this optical network system 1 is achieved as follows.

The master unit 3 further includes a master control unit 19.

The master control unit 19 has a reference signal source that oscillates a reference signal and a multiplier that multiples a frequency of the reference signal from the reference signal source and outputs a multiplied signal.

The master control unit 19 generates signals having two or more types of frequencies by using the reference signal source and the multiplier and drives the signal processing unit 13 and the network control unit 15 by using the generated signals having different frequencies.

One of preferable aspects of this optical network system 1 is achieved as follows.

The gateway units 5a, 5b, and 5c allow the optical signal corresponding to the electrical signal to pass when the gateway units 5a, 5b, and 5c are not designated by the electrical signal.

The optical signal corresponding to the electrical signal is read when the gateway units 5a, 5b, and 5c are designated by the electrical signal, and the electrical signal contains a command for reading the information.

Information is written to the continuous light portion of the optical signal corresponding to the electrical signal when the gateway units 5a, 5b, and 5c are designated by the electrical signal, and the electrical signal contains a command for writing the information.

One of preferable aspects of this optical network system 1 is achieved as follows.

The light source 11 is a multi-wavelength light source.

Each of the plurality of gateway units 5a, 5b, and 5c receives an optical signal having any one of a plurality of types of wavelengths of the optical signals from the multi-wavelength light source.

The next aspect of the present invention relates to an information control method. This method is achieved, for example, by using the optical network system 1 described above.

This method includes, for example, an optical signal generating process, an electrical signal generating process, a signal receiving process, an electrical signal analysis process, an optical signal reading process, an optical signal writing process, an electronic control unit control process, and an optical signal analysis process.

In the optical signal generating process, the signal processing unit 13 of the master unit 3 controls the light source 11 to generate an optical signal having an information portion to be read by any one of a plurality of gateway units and a continuous light portion to be written by any one of the gateway units.

In the electrical signal generating process, the network control unit 15 of the master unit 3 designates any one of the gateway units and generates an electrical signal regarding whether to read or write information loaded on the optical signal from the light source.

In the signal receiving process, the gateway units 5a, 5b, and 5c receive the optical signal and the electrical signal.

In the electrical signal analysis process, the gateway units 5a, 5b, and 5c analyze the received electrical signal to analyze whether or not they are designated. When the gateway units 5a, 5b, and 5c are designated, the information contained in the electrical signal regarding whether reading or writing is performed is analyzed.

In the optical signal reading process, when the gateway units 5a, 5b, and 5c are designated, and information regarding reading is contained in the electrical signal, the information contained in the optical signal corresponding to the received electrical signal is read.

In the optical signal writing process, when the gateway units 5a, 5b, and 5c are designated, and information regarding writing is contained in the electrical signal, information is written to the continuous light portion included in the optical signal corresponding to the received electrical signal.

In the electronic control unit control process, the gateway units 5a, 5b, and 5c exchange information with the electronic control unit 7.

In the optical signal analysis process, the photodetector 17 of the master unit 3 reads the information written to the continuous light portion by any one of the gateways.

A preferable aspect of this information control method is achieved as follows.

That is, the master control unit 19 of the master unit 3 generates signals having two or more types of frequencies using a reference signal source and a multiplier and drives the signal processing unit 13 and the network control unit 15 using the generated signals having different frequencies.

Advantageous Effects

According to the present invention, an optical network is configured using a single light source by combining an electrical C-plane and an optical D-plane. Therefore, it is possible to provide an optical network having very excellent performance in a large capacity property, a low delay property, a low power consumption property, and the like, compared to in-vehicle network systems (electric and optical) proposed in the art.

BRIEF DESCRIPTION OF DRAWINGS

FIG. 2 shows a conceptual diagram illustrating an example of an in-vehicle optical network using an electrical switch, in which FIG. 2(a) illustrates a star type, and FIG. 2(b) illustrates a ring type.

FIG. 3 shows a conceptual diagram illustrating an example of an all-optical type in-vehicle optical network, in which FIG. 3(a) illustrates an example using an optical splitter, and FIG. 3(b) illustrates an example using an optical switch.

FIG. 4 shows a diagram for explaining a basic configuration of an optical network system, in which FIG. 4(a) is conceptual diagram illustrating a basic configuration example of the optical network system, and FIG. 4(b) is conceptual diagram for describing an operation principle.

FIG. 5 shows a conceptual diagram illustrating an example of an interface in a gateway, in which FIG. 5(a) illustrates an electro-absorption type interface device, and FIG. 5(b) illustrates a Fabry-Perot interference type interface device.

FIG. 7 shows a conceptual diagram for explaining a multi-wavelength optical network system, in which FIG. 7(a) is a conceptual diagram illustrating a physical configuration of the multi-wavelength optical network system, and FIG. 7(b) is a diagram for explaining a logical configuration of the multi-wavelength optical network system.

FIG. 8 shows a conceptual diagram illustrating an example of a device operating at a specific wavelength, in which FIG. 8(a) illustrates a combination of the electro-absorption type device of FIG. 5(a) and a ring resonator for the wavelength selector, and FIG. 8(b) illustrates a bandpass filter installed in the Fabry-Perot interference type device of FIG. 5(b).

FIG. 9 shows a conceptual diagram illustrating a network configuration example of a star topology, in which FIG. 9(a) illustrates an example of a case of a single wavelength, and FIG. 9(b) illustrates an example of a case of a plurality of wavelengths.

DETAILED DESCRIPTION

Hereinafter, modes for embodying the present invention will be described with reference to the accompanying drawings. The present invention is not limited to the modes described below and encompasses any modification within the scope apparent to those skilled in the art from the modes described below.

Basic Configuration of Optical Network System

Figure 4:
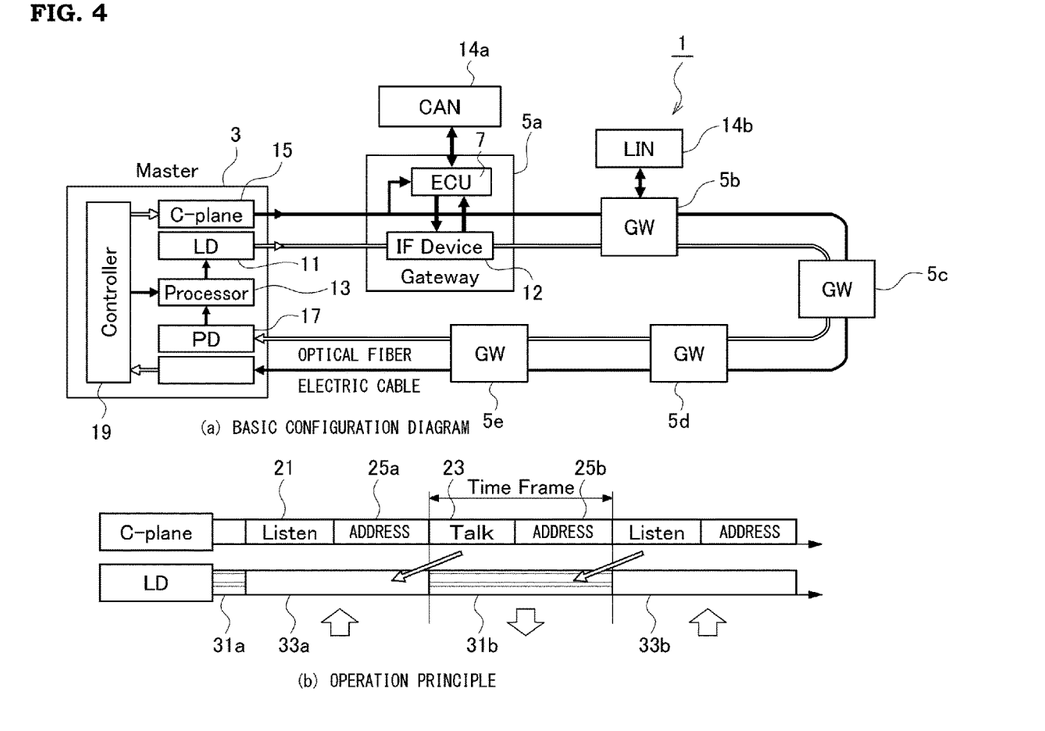

FIG. 4 is a diagram for explaining a basic configuration of an optical network system. FIG. 4(a) is a conceptual diagram illustrating a basic configuration example of the optical network system. FIG. 4(b) is a conceptual diagram for explaining an operation principle. The example illustrated in FIG. 4 is an in-vehicle optical network system. Naturally, this concept may be used for other in-mobility optical network systems or short-range optical network systems.

This optical network system 1 includes a (first) master unit 3, a plurality of gateway units 5a, 5b, 5c, 5d, and 5e connected to a (second) master unit 3, and an electronic control unit 7 connected to each of a plurality of (third) gateway units 5a, 5b, and 5c.

The master unit 3 has a light source (LD) 11, a signal processing unit (processor) 13, a network control unit (c-plane) 15, and a photodetector (PD) 17. The light source (LD) may be arranged only in a master. In addition, an interface (IF) device is arranged in each gateway unit (GW). For example, in a ring type configuration, each gateway unit (GW) is connected by an optical fiber to form a high-speed loop-shaped optical data plane (D-plane).

The signal processing unit 13 controls the light source 11 to generate an optical signal including an information portion 31a and 31b to be read by any one of the gateway units and a continuous light portion 33a and 33b to be written by any one of the gateway units.

The network control unit (c-plane) 15 designates any one of the gateway units (address units 25a and 25b) and generates an electrical signal including a read/write signal (Listen/Talk) 21 and 23 regarding whether to read or write the information loaded on the optical signal from the light source.

When designated by an electrical signal, each gateway unit 5a, 5b, and 5c reads the information contained in the corresponding optical signal or write the information to the continuous light portion and exchanges information with the electronic control unit 7 on the basis information regarding whether to read or write the information contained in the electrical signal.

The photodetector 17 reads the information written to the continuous light portion by any one of the gateways.

One of preferable aspects of this optical network system 1 is achieved as follows.

The master unit 3 further includes a master control unit 19.

In addition, the master control unit 19 includes a reference signal source that oscillates a reference signal and a multiplier that multiplies a frequency of the reference signal from the reference signal source and outputs a multiplied signal.

The master control unit 19 generates signals having two or more types of frequencies by using the reference signal source and the multiplier and drives the signal processing unit 13 and the network control unit 15 by using the generated signals having different frequencies. Since the master control unit 19 drives the signal processing unit 13 and the network control unit 15, the optical signal output from the light source 11 and the electrical signal output from the network control unit (c-plane) 15 are synchronized. The multiplier is a device that outputs a signal having a frequency that is an integer multiple of the input reference signal.

Gateway Unit

A plurality of gateway units 5a, 5b, 5c, 5d, and 5e are connected to the master unit 3. In the example of FIG. 4, a plurality of gateway units 5a, 5b, 5c, 5d, and 5e continuously exist on a light propagation path that exits from the master unit 3 and returns to the master unit 3. However, the gateway units 5a, 5b, 5c, 5d, and 5e also exist on an electrical wiring that exits from the master unit 3 and returns to the master unit 3. The gateway unit is a part that acts as a relay point for transmitting information from the master unit 3 to various devices and transmitting information from various devices or sensors to the master unit 3. For example, each gateway is connected to various groups such as a safety system, a control system, an information system, and a body control system via an electronic control unit (ECU). For example, the safety system includes an in-vehicle camera, a radar, and the like (FlexRay). For example, the control system includes an engine, a brake, and the like (CAN14a). For example, the information system includes a car navigation, video, audio, and the like (MOST). For example, the body control system includes a window, a mirror, and the like (LIN14b).

Electronic Control Unit (ECU)

The electronic control unit 7 is connected to each of the plurality of gateway units 5a, 5b, and 5c, and transmits the control signal from the master unit 3 to various devices. In addition, the information from various devices is transmitted to the master unit 3 via the electronic control unit 7.

In addition, the electronic control units (ECUs) in the master and all GWs are electrically connected by a low-speed control plane (C-plane). Which GW receives data (Listen) and which GW transmits data (Talk) are designated by the address transmitted from the master and the Listen/Talk flag.

In this case, the entire network operates in a given time frame cycle, and the GW designated on the C-plane executes an operation of reading or writing data in the next frame with respect to the Listen/Talk flag. That is, when data is transmitted from the master to the GW, the master loads the data on the light and transmits it. Then, the designated GW is set to a reverse bias on the basis of the Listen flag and reads the data. In contrast, when data is transmitted from the GW to the master, a frame of given intensity CW light is transmitted from the master, and the designated GW modulates data to CW light immediately after the Talk flag. Then, the frame is received by the PD in the master again.

Furthermore, an important role of the C-plane is distribution of universal clocks. Similar to the LD, only the master is equipped with a reference oscillator, and signals of the C-plane and D-plane are generated by multiplying the frequency of that oscillator to a necessary frequency. All the GWs receive the signal from the master via the C-plane at all time, and a common clock can be extracted from the signal. Each GW transmits and receives optical signals on the D-plane by using the common clock signal without having its dedicated oscillator. For this reason, all of the optical signals transmitted from each GW to the master have the same frequency (bit synchronization), and the master can easily receive the optical signal by using the clock signal owned by itself without extracting the clock again with the burst-mode receiver.

Next, an operation example of the optical network system of FIG. 4 will be described.

In the master unit 3, the signal processing unit (processor) 13 controls the light source (LD) 11 to output optical signals (for example, modulated signals) 31a and 31b containing various information and the continuous light portions 33a and 33b for writing. Meanwhile, the signal processing unit (processor) 13 controls the network control unit (c-plane) 15 to generate address signals 25a and 25b for designating the gateway or an electrical signal containing a Listen signal 21 regarding whether the gateway designated by the address signal reads the information 31a and 31b loaded on the optical signal or a Talk signal 23 regarding whether the gateway writes the information to the continuous light portions 33a and 33b of the optical signal and transmit the signals to the gateway via an electric line. In addition, the optical signal and the electrical signal are synchronized.

For example, the first gateway 5a optical-electrically (O/E) converts the optical signal via the interface 12 and transmits it to the electronic control unit 7. In addition, the electrical signal from the electronic control unit 7 may be electric-optically (E/O) converted, for example, by the interface 12. For example, the electronic control unit 7 analyzes the electrical signal, and analyzes the next read/write signal when the address 25a is the first gateway. As a result, in the case of the read signal (Listen signal), the corresponding optical signal 31a is read. In addition, the electronic control unit 7 controls various control devices CAN14a such as an engine and a brake depending on the read optical signal 31a. Meanwhile, when the address information designates a gateway other than the first gateway, for example, the optical signal directly passes, and the optical signal is transmitted to the next gateway. In addition, when the electrical signal is a signal indicating writing (Talk signal 23), the information output from the various devices 14a is written to the corresponding continuous light portion 33a depending on the control signal of the electronic control unit 7.

That is, when the gateway units 5a, 5b, and 5c are not designated by the electrical signal, the optical signal corresponding to the electrical signal passes. Otherwise, when the gateway units 5a, 5b, and 5c are designated by the electrical signal, and the electrical signal contains a command for reading information, the optical signal corresponding to the electrical signal is read. In addition, when the gateway units 5a, 5b, and 5c are designated by the electrical signal, and the electrical signal contains a command for writing information, the information is written to the continuous light portion of the optical signal corresponding to the electrical signal.

Figure 5:
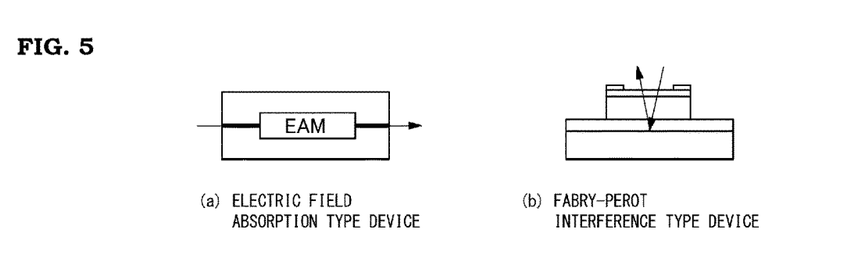
Figure 6:
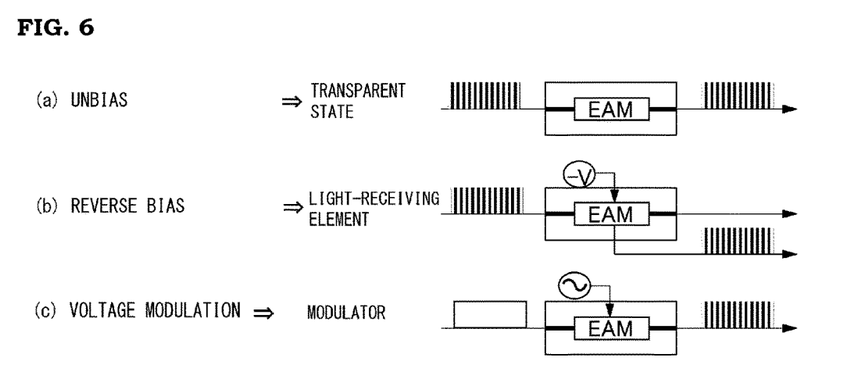
FIG. 6 shows a conceptual diagram for explaining an operation example of the interface.

FIG. 5 is a conceptual diagram illustrating an example of an interface in the gateway. FIG. 5(a) illustrates an electro-absorption type interface device, and FIG. 5(b) illustrates a Fabry-Perot interference interface device. FIG. 6 is a conceptual diagram for explaining an operation example of the interface. The electro-absorption type device allows light to directly pass (transparent state) in an unbiased state. Meanwhile, the electro-absorption type device functions as a photodetector in the reverse bias state. That is, optical information can be read by applying a reverse bias. Furthermore, the electro-absorption type device functions as a modulator by modulating the voltage (biased state). For this reason, the electro-absorption type device can superimpose the modulation signal on the continuous light, and thereby the information can be loaded on the optical signal.

For example, the interface (IF) is a polarization-independent IF device, and may include an electro-absorption type device (generally called "Electro-Absorption Modulator: EAM") or a Fabry-Perot interference type device having an active layer interposed between two reflection mirrors. FIG. 5 is a conceptual diagram illustrating an electro-absorption type device and a Fabry-Perot interference type device. These devices are transparent in an unbiased state with no voltage applied and allow light to pass with little loss. In addition, when these devices are in a reverse bias state, the input light is absorbed and output as an electrical signal, so that these devices operate as photodetectors (PD). Furthermore, when voltage modulation is applied with a high-speed electrical signal, absorption/transmission is repeated, so that these devices operate as optical modulators. That is, these devices can output a modulated optical signal for continuous light.

Multi-Wavelength Optical Network System

In a preferable example of this optical network system, the light source 11 is a multi-wavelength light source. The multi-wavelength light source may have one light source and a multi-wavelength device (for example, an optical comb transmitter device), or may be a light source having a plurality of light sources (such as LED). In addition, each of the plurality of gateway units 5a, 5b, and 5c receives an optical signal having any one of wavelengths among the optical signals of a plurality of types of wavelengths from the multi-wavelength light source.

Figure 7:
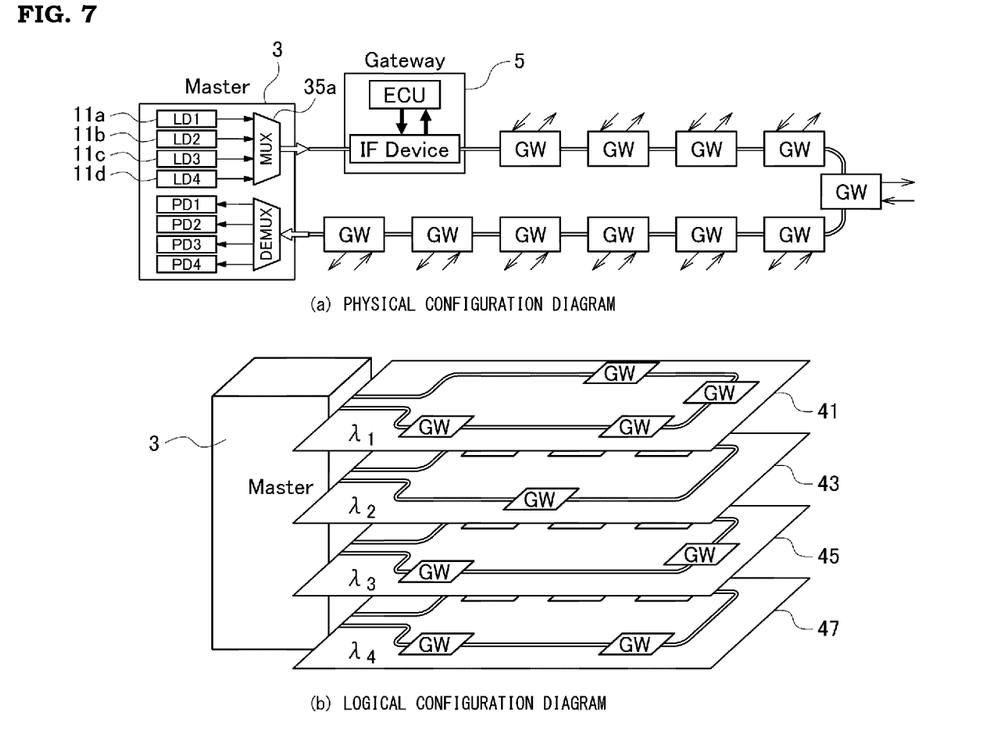

FIG. 7 is a conceptual diagram for explaining the multi-wavelength optical network system. FIG. 7(a) is a conceptual diagram illustrating a physical configuration of the multi-wavelength optical network system, and FIG. 7(b) is a diagram for explaining a logical configuration of the multi-wavelength optical network system. In the example of FIG. 7, the lights from the light sources 11a, 11b, 11c, and 11d having four types of wavelengths are multiplexed by a multiplexer (combiner) 35a and are output as an optical signal. Each gateway reacts only to a light having a specific wavelength and passes lights of other wavelengths. As illustrated in FIG. 7(b), each gateway exchanges information only using a light having a specific wavelength. Therefore, even when all of the gateways are physically connected by a single waveguide, it logically functions as if an optical network exists for each wavelength. That is, using the multi-wavelength light source, this optical network system functions as an optical network logically having a plurality of logic layers 41, 43, 45, and 47 corresponding to lights $\lambda 1$, $\lambda 2$, $\lambda 3$, and $\lambda 4$ of each wavelength.

The next invention of the present specification relates to an information control method. This method uses, for example, the optical network system 1 described above. This method includes, for example, an optical signal generating process, an electrical signal generating process, a signal receiving process, an electrical signal analysis process, an optical signal reading process, an optical signal writing process, an electronic control unit control process, and an optical signal analysis process.

In the optical signal generating process, the signal processing unit 13 of the master unit 3 controls the light source 11 to generate an optical signal containing an information portion to be read by any one of a plurality of gateway units and a continuous light portion to be written by any one of the gateway units. An example of the optical signal is illustrated in FIG. 4(b), and the optical signal contains information portions 31a and 31b and continuous light portions 33a and 33b. Preferably, the light intensity of the continuous light portion is constant.

In the electrical signal generating process, the network control unit 15 of the master unit 3 designates any one of the gateway units and generates an electrical signal regarding whether to read or write the information loaded on the optical signal from the light source. An example of the electrical signal is illustrated in FIG. 4(b). The address portions 25a and 25b of the electrical signal are portions for designating the gateway units. Meanwhile, the Listen signal 21 and the Talk signal 23 of the electrical signal are electrical signals regarding whether to read or write the information loaded on the optical signal.

In the signal receiving process, the gateway units 5a, 5b, and 5c receive the optical signal and the electrical signal. The interface device 12 of the gateway unit 5 receives the optical signal, converts it into an electrical signal, and transmits the electrical signal to the electronic control unit 7. Meanwhile, the gateway unit 5 receives the electrical signal and transmits it to the electronic control unit 7.

In the electrical signal analysis process, the gateway units 5a, 5b, and 5c analyze the received electrical signal to analyze whether or not they are designated. When the gateway units 5a, 5b, and 5c are designated, the information contained in the electrical signal regarding whether reading or writing is performed is analyzed. As described above, the electronic control unit 7 receives the optical signal converted into the electrical signal and the electrical signal. In addition, the address signal of the electrical signal is analyzed to know whether or not it is designated by itself In the optical signal reading process, when the gateway units 5a, 5b, and 5c are designated, and information regarding the reading is contained in the electrical signal, information contained in the optical signal corresponding to the received electrical signal is read. When the Listen signal 21 is contained in the electrical signal, the electronic control unit 7 reads the information 31a corresponding to the Listen signal 21 contained in the corresponding optical signal using the interface device 12. The interface device 12 transmits the read information to the electronic control unit 7. The electronic control unit 7 controls various devices 14a connected to the electronic control unit 7 depending on the read information.

In the optical signal writing process, when the gateway units 5a, 5b, and 5c are designated, and information regarding writing is contained in the electrical signal, information is written to the continuous light portion included in the optical signal corresponding to the received electrical signal. Meanwhile, when the electrical signal contains the Talk signal 23, the electronic control unit 7 controls the interface device 12 to function as, for example, a modulator, and loads various information on the corresponding continuous light portion 33a.

In the electronic control unit control process, the gateway units 5a, 5b, and 5c exchange information with the electronic control unit 7.

In the optical signal analysis process, the photodetector 17 of the master unit 3 reads the information written to the continuous light portion by any one of the gateways. In the optical signal writing process, any one of the gateway units writes information to the continuous light portion included in the optical signal corresponding to the received electrical signal. For example, when the electrical signal contains the Talk signal 23, the electronic control unit 7 controls the interface device 12 to function as, for example, a modulator, and loads various information on the corresponding continuous light portion 33a. The portion of the optical signal on which various information is loaded as a modulation signal or the like (the portion that was originally the continuous light portion 33*a*) is received by the photodetector 17, and the photodetector 17 analyzes the information such as the modulation signal.

A preferable aspect of this information control method is achieved as follows.

That is, the master control unit 19 of the master unit 3 generates a signal having two or more types of frequencies using a reference signal source and a multiplier, and drives the signal processing unit 13 and the network control unit 15 on the basis of the generated signals of different frequencies.

This optical network system is a new optical network for short-distance communication that has never been seen before, in which a laser is placed only in the master, and a low-speed electric C-plane for addressing and network control and a high-speed optical D-plane for transmitting large capacity data are arranged in parallel. This optical network system has a lot of advantages as described below.

Low Power Consumption Property

Systems using optical transceivers consume a lot of current because they need to keep transmitting dummy signals even when there is no data to transmit. Meanwhile, this optical network system can remarkably reduce the number of such optical transceivers. Meanwhile, the IF device used in the GW is a voltage-controlled device with low power consumption. When no address is designated, the IF device does not consume power in a standby state (unbiased). In addition, for a given time frame, only the addressed IFs among a plurality of IF devices are operated (acting as PDs or modulators in some cases). That is, an optical network system to which a plurality of GWs are connected consumes power equivalent to that of the case where one optical transceiver (LD+PD) and one IF device are operated, which enables very low power consumption operation.

Low Delay Property

The IF devices that are not addressed are transparent, and the optical signal passes as light. Therefore, all masters and GWs are perfectly optically connected point to point without using an electrical switch or an optical switch, so that data can transfer with very low delay.

Expandability/Large Capacity Property

In the case of a network using an electrical switch, the number of GWs is limited by the number of input ports of the electrical switch. In the case of this network, it is possible to add or expand the GW to any location of the ring-shaped optical line. In addition, a wavelength division multiplexing (WDM) scheme is employed as a method for increasing the data transfer capacity. However, in the method using the optical transceiver of the prior art, the LDs and PDs in the master and GW increase in proportion to the number of wavelengths. Therefore, the cost and power consumption increase accordingly. In this method, the number of LDs/PDs in the master increases in proportion to the number of wavelengths, but as described below, the GW can operate with a single IF device regardless of the number of wavelengths, so that the cost and the power consumption do not noticeably increase.

Synchronous System

In this optical network system, a reference oscillator is provided only in the master, and a common clock signal is distributed to all GWs by the electric C-plane. Therefore, the entire system operates in a perfectly synchronized state, and the master and GW can transmit and receive optical signals without using an expensive optical burst-mode receiver.

Reliability/Maintainability

The laser is a current-controlled device that converts an injected current into light and has a given service lifetime. Meanwhile, the IF device illustrated in FIG. 5 is a voltage-controlled device in which nearly no current flows, and generally has an extremely long service lifetime. For this reason, the service lifetime of this system is extended because the optical transceiver in the GW is replaced with the IF device. In addition, when the LD fails, according to the present invention, only the LD in the master device may be replaced, so that the maintainability is greatly improved. Furthermore, in a network that uses electrical switches or optical switches, the entire network may stop when any switch fails. In comparison, since the IF device becomes transparent at the time of failure, and the light directly passes, only a sub-network connected to the GW stops, and the entire network does not stop.

Wavelength Division Multiplexing

Figure 8:
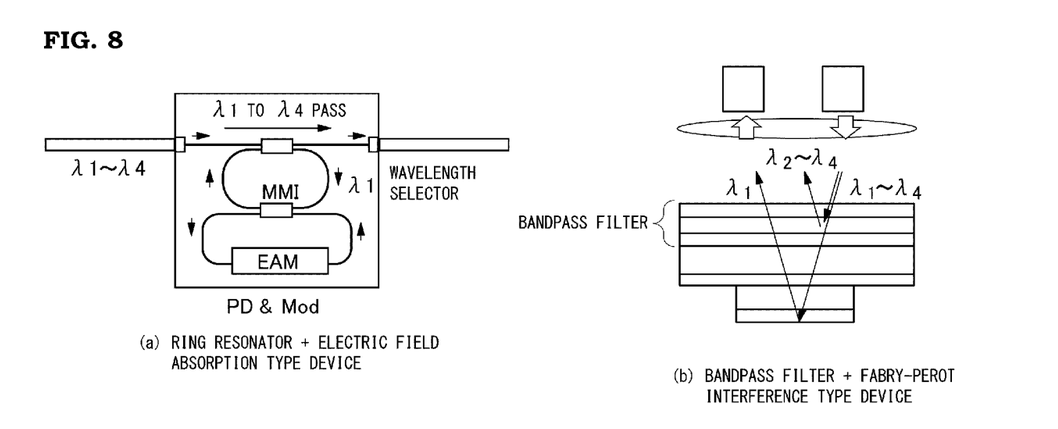

When it is desired to further increase the number of GWs or the capacity of the entire network, it is effective to use the wavelength division multiplexing (WDM) scheme as illustrated in FIG. 7. In general, lasers of different wavelengths are arranged in parallel, and the light is multiplexed using an optical multiplexing circuit and is inserted into a single optical fiber. On the contrary, in the receiving side, an optical demultiplexing circuit is used to spatially separate it for each wavelength, and the light is received by another photodetector. As the IF device in the GW, a device that operates only at a specific wavelength as illustrated in FIG. 8 is employed. FIG. 8 is a conceptual diagram illustrating an example of a device operating at a specific wavelength. FIG. 8(*a*) is a combination of the electro-absorption type device of FIG. 5(*a*) and a ring resonator for the wavelength selector. In the drawings, a ring resonator that resonates with a wavelength of $\lambda 1$ is installed, and the light of $\lambda 1$ is transmitted to the EAM. However, lights of other wavelengths pass through the ring resonator and are transmitted directly to the fiber of the output side. FIG. 8(*b*) illustrates a bandpass filter installed in the Fabry-Perot interference type device of FIG. 5(*b*). In this case, only a specific wavelength passes through the bandpass filter and is incident to the Fabry Perot interference type device, and lights of other wavelengths are reflected by the bandpass filter with nearly no loss. The operation of the electro-absorption type device or the Fabry-Perot interference type device is similar to that described above.

When this optical network system is converted into a WDM form, in the D-plane, only the light source of the master may be converted into the multi-wavelength form, and the IF device in the GW is a single device regardless of the number of wavelengths. Furthermore, in the C-plane, a single C-plane may be deployed regardless of the number of wavelengths as described above, and the operation principle of the entire network is similar to that described above. However, in this case, it is necessary to designate the GW address corresponding to each wavelength for one time frame. Furthermore, in this case, as illustrated in FIG. 7, while the physical configuration is a single ring network, a plurality of wavelength layers are overlaid in the logical configuration. Since these wavelength layers can be operated independently, it is possible to configure a flexible network depending on the functions and requirements by freely setting the operating speed or the transfer protocol for each wavelength.

Figure 9:
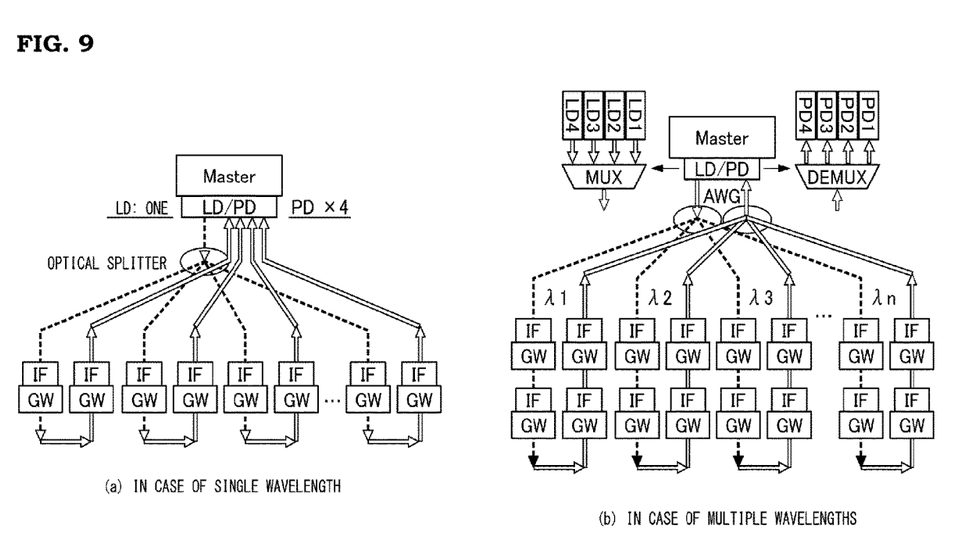

While a ring configuration network has been described hereinbefore, an example of a star type topology network configuration example is illustrated in FIG. 9. FIG. 9 is a conceptual diagram illustrating a star type topology network configuration example. FIG. 9(*a*) illustrates an example in the case of a single wavelength, and FIG. 9(*b*) illustrates an example in the case of a plurality of wavelengths. In the case of a single wavelength, the optical signal transmitted from the master is divided by an optical splitter and is transmitted back to the master via several GWs. In this case, by using a plurality of receivers in the master side, signals from a plurality of GWs can be received at the same time, and the network throughput increases. When the WDM is further performed, the wavelength division multiplexed optical signal transmitted from the master is demultiplexed for each wavelength by the optical demultiplexing circuit, passes through a plurality of GWs, is multiplexed again by the optical multiplexing circuit, and is transmitted to the master. In this case, since the wavelength band in the transmission side of the master also increases, compared to the case of a single wavelength, it is possible to insert more GWs. Furthermore, since each optical path is separated for each wavelength, it is possible to use the most basic device illustrated in FIG. 5 as the IF device.

INDUSTRIAL APPLICABILITY

The present invention is applicable to the field of short-range optical information communication such as an in-vehicle optical network. In addition, the present invention is applicable as a new short-range large-capacity optical communication system not only for cars such as automobiles but also for various vehicles such as airplanes, ships, and trains.

REFERENCE SIGNS AND NUMERALS 1 optical network system
3 master unit
5a, 5b, 5c gateway unit
7 electronic control unit
11 light source
13 signal processing unit
15 network control unit
17 photodetector

What is claimed is:

1. An optical network system (1) comprising:
a master unit (3);
a plurality of gateway units (5a, 5b, 5c) connected to the master unit (3); and
an electronic control unit (7) connected to each of the plurality of gateway units (5a, 5b, 5c),
wherein the master unit (3) includes a light source (11), a signal processing unit (13), a network control unit (15), and a photodetector (17),
the signal processing unit (13) controls the light source (11) to generate an optical signal containing an information portion to be read by any one of the gateway units and a continuous light portion to be written by any one of the gateway units,
the network control unit (15) designates any one of the gateway units and generates an electrical signal regarding whether to read or write information loaded on the optical signal from the light source,
each of the gateway units (5a, 5b, 5c), when designated by the electrical signal, reads information contained in a corresponding optical signal, which corresponds to the electric signal, or writes information to the continuous light portion in the corresponding optical signal, and exchanges information with the electronic control unit (7) on the basis of information regarding whether to read or write information contained in the electrical signal when designated by the electrical signal, and the photodetector (17) reads the information written to the continuous light portion by any one of the gateways.

2. The optical network system according to claim 1, wherein
the master unit (3) further includes a master control unit (19), and
the master control unit (19) has a reference signal source that oscillates a reference signal and a multiplier (23) that multiples a frequency of the reference signal from the reference signal source and outputs a multiplied signal, generates signals having two or more types of frequencies by using the reference signal source and the multiplier, and drives the signal processing unit (13) and the network control unit (15) by using the signals having two or more types of frequencies.

3. The optical network system according to claim 1, wherein
the gateway units (5a, 5b, 5c) allow the corresponding optical signal, which corresponds to the electrical signal, to pass when the gateway units (5a, 5b, 5c) are not designated by the electrical signal,
the optical signal corresponding to the electrical signal is read when the gateway units (5a, 5b, 5c) are designated by the electrical signal, and the electrical signal contains a command for reading the information, and
information is written to the continuous light portion of the optical signal corresponding to the electrical signal when the gateway units (5a, 5b, 5c) are designated by the electrical signal, and the electrical signal contains a command for writing the information.

4. The optical network system according to claim 1, wherein
the light source (11) is a multi-wavelength light source for generating a plurality types of optical signals, each having a different wavelength, and
each of the plurality of gateway units (5a, 5b, 5c) receives one of the plurality of types of optical signals.

5. An information control method performed by the optical network system according to claim 1, the method comprising:
controlling the light source (11) to generate the optical signal having the information portion to be read by any one of the plurality of gateway units and the continuous light portion to be written by any one of the gateway units by the signal processing unit (13) of the master unit (3);
designating any one of the gateway units and generating the electrical signal regarding whether to read or write information loaded on the optical signal from the light source by the network control unit (15) of the master unit (3);
receiving the optical signal and the electrical signal by the gateway units (5a, 5b, 5c);
reading information contained in the corresponding optical signal or writing information to the continuous light portion on the basis of the information regarding whether to read or write the information contained in the electrical signal when the gateway unit (5a, 5b, 5c) is designated by the electrical signal by the gateway units (5a, 5b, 5c);
exchanging information with the electronic control unit (7) by the gateway units (5a, 5b, 5c); and
reading the information written to the continuous light portion by any one of the gateways by the photodetector (17) of the master unit (3).

6. The information control method according to claim 5, further comprising:

generating signals having two or more types of frequencies using a reference signal source and a multiplier and driving the signal processing unit (13) and the network control unit (15) using the signals having two or more types of frequencies generated by the master control unit (19) of the master unit (3).

\* \* \* \* \*